United States Patent [19]

Bower et al.

[11] 4,160,125
[45] Jul. 3, 1979

[54] TELEPHONE POLLING APPARATUS

[75] Inventors: David S. Bower, Sunrise; Fred J. Smith, Plantation, both of Fla.

[73] Assignee: Digital Products Corporation, Fort Lauderdale, Fla.

[21] Appl. No.: 799,141

[22] Filed: May 23, 1977

[51] Int. Cl.² .................. H04M 3/46; H04M 3/50
[52] U.S. Cl. .................. 179/6 D; 179/6 C; 179/18 B; 179/90 B
[58] Field of Search .......... 179/6 R, 6 C, 6 D, 1 VC, 179/5 R, 5 P, 18 B, 90 BB, 90 B, 100.1 VC, 18 BE

[56] References Cited

U.S. PATENT DOCUMENTS

| | | | |
|---|---|---|---|
| 1,843,849 | 2/1932 | Thornton | 179/6 R |
| 3,427,403 | 2/1969 | Stokes et al. | 179/5 |
| 3,445,601 | 5/1969 | Whitely et al. | 179/6 D |
| 3,644,675 | 2/1972 | Watlington | 179/6 R |
| 3,733,440 | 5/1973 | Sipes | 179/6 D |
| 3,909,538 | 9/1975 | Jacobson | 179/6 R |
| 3,925,622 | 12/1975 | Robinson | 179/6 R |
| 3,943,289 | 3/1976 | Sheldon et al. | 179/6 D |
| 3,999,017 | 12/1976 | Thorne | 179/6 D |
| 4,001,508 | 1/1977 | Johnson | 179/6 D |

Primary Examiner—Raymond F. Cardillo, Jr.
Attorney, Agent, or Firm—Lerner, David, Littenberg & Samuel

[57] ABSTRACT

Telephone polling apparatus is disclosed for supplying a prerecorded message to a plurality of telephone subscriber stations in sequence and recording responses from the stations after supplying the message thereto. The apparatus stores a telephone number to be called, couples the apparatus to a telephone line, and responds to a dial tone on the telephone line to place a call over the telephone line to the station identified by the stored telephone number. An energy detection device in cooperation with timing elements provides discrimination between a busy condition, an answer condition, a recorded announcement condition, and a no answer condition on the telephone line. When an answer condition is detected, the prerecorded message is transmitted over the telephone line, and, at the end thereof, a recording medium is coupled to the telephone line for recording a response to the message. A selectively variable time period is provided for recording the response. At the end of the time period, the apparatus is uncoupled from the telephone line. The apparatus further includes a sequencer which is responsive to the uncoupling or the discrimination of either the busy condition, the no answer condition, or the recorded announcement condition, for incrementing the stored telephone number by a predetermined number and for activating the coupling again.

8 Claims, 8 Drawing Figures

TELEPHONE POLLING APPARATUS

BACKGROUND OF THE INVENTION

This invention relates to message announcement and response recording systems, and, more particularly, to telephone polling apparatus for supplying a prerecorded message to a plurality of telephone subscriber stations in sequence and recording responses from the stations after supplying the message thereto.

Telephone polling has, in recent years, gained popularity as a means for reaching a large number of people on an individual, personalized basis, in order to deliver a message, such as a commercial advertisement or a sales solicitation. Typically, in the past, such polling has been achieved by utilizing manual dialing and message delivery, which is relatively expensive. Additionally, this manual method of polling is susceptible to human dialing error, resulting in either wrong numbers being dialed or the same number being dialed more than once.

To overcome certain of the disadvantages of a manual polling arrangement, different systems have been devised to effect the automatic sequential dialing and announcement function. For example, U.S. Pat. No. 3,943,289 discloses apparatus wherein a prerecorded message is supplied to a plurality of telephone subscriber numbers automatically called in sequence from a local station. Upon placing the call to the first number, another second number is established by changing the first called number by a predetermined increment. In response to the first called number being reached, the prerecorded message is coupled to a telephone line at the local station. In response to the call being either completed or the elapse of a predetermined time during which it is expected that the called subscriber should answer the telephone, a termination signal is derived to indicate that operations for the first party have been terminated. In response to the termination signal, the telephone is repeatedly hung up and picked up automatically until the prerecorded message has been completed and a dial tone has been detected, at which time the second number is called. The device is activated repeatedly in this manner.

However, the apparatus disclosed in the aforementioned patent suffers from a number of disadvantages. For example, no response recording capability is disclosed, although it is mentioned that such can be provided. Such response recording capability is advantageous when making a sales solicitation because the called party can be requested to supply his name and telephone number, or address, for future follow-up by a sales person. Additionally, it would be desirable to have response recording capability wherein the response time is selectively adjustable dependent upon the type of information it is desired to record during the response. A further disadvantage of the apparatus disclosed in the patent is that the disclosed apparatus will deliver a message even if the called number is answered by a telephone answering device which delivers a recorded message. This is an obvious undesirable attribute.

It is therefore an object of the present invention to provide apparatus for supplying a prerecorded message to a plurality of telephone subscriber stations in sequence and recording responses from the stations after supplying the message thereto.

It is another object of the present invention to provide such apparatus wherein the response recording time is selectively adjustable.

It is a further object of the present invention to provide such apparatus which, after placing the call, can discriminate between a busy condition, an answer condition, a recorded announcement condition, and a no answer condition, on the telephone line, so that message delivery is only effected upon discrimination of an answer condition.

It is still another object of the present invention to provide such apparatus wherein the number of calls to be made and the initial phone number to be called may be readily programmed into the apparatus.

It is still a further object of the present invention to provide such apparatus wherein the phone number being called and the number of calls still to be made are displayed.

It is yet another object of the present invention to provide such apparatus wherein message delivery and response recording may be monitored by an operator.

It is yet a further object of the present invention to provide such apparatus wherein the present activity of the apparatus, such as dialing, message delivery, etc., is displayed.

SUMMARY OF THE INVENTION

The foregoing and additional objects are attained in accordance with the principles of this invention by providing apparatus for supplying a prerecorded message to a telephone line. The apparatus comprises dialing means responsive to a start signal for providing dial signals indicative of a telephone number to said telephone line and a number complete signal upon completion of said providing; means rendered effective by said number complete signal and responsive to energy on said telephone line for providing a first signal in response to an energy condition on said telephone line indicative of an answer condition and providing a second signal in response to an energy condition on said telephone line indicative of a condition other than said answer condition; means responsive to said first signal transmitting said prerecorded message over said telephone line; means responsive to the end of said prerecorded message for generating said second signal; and means responsive to said second signal for providing said start signal.

In accordance with an aspect of this invention, the apparatus includes means for storing the telephone number to be called and means responsive to the number complete signal for incrementing the stored telephone number by a predetermined number.

In accordance with another aspect of this invention, the apparatus includes means responsive to the end of the message for coupling a recording medium to the telephone line and means responsive to the end of the message for timing a predetermined interval and generating said second signal at the termination of the predetermined timed interval.

In accordance with yet another aspect of this invention, the apparatus includes means for selectively adjusting the predetermined interval so as to provide response recording time adjustment.

In accordance with a further aspect of this invention, the apparatus includes means whereby the message announcement and response recording may be monitored by an operator.

In accordance with still another aspect of this invention, the initial phone number to be called and the number of calls to be made are readily programmed into the apparatus.

In accordance with yet a further aspect of this invention, there is provided a visual display showing the phone number being called, the number of calls still to be made and the present activity of the apparatus.

DESCRIPTION OF THE DRAWING

The foregoing will be more readily apparent upon reading the following description in conjunction with the drawing in which:

FIG. 1, which comprises FIGS. 1A and 1B with FIG. 1A placed to the left of FIG. 1B, depicts a functional block schematic diagram of apparatus constructed in accordance with the principles of this invention;

DESCRIPTION OF THE PREFERRED EMBODIMENT

Figure 1A:
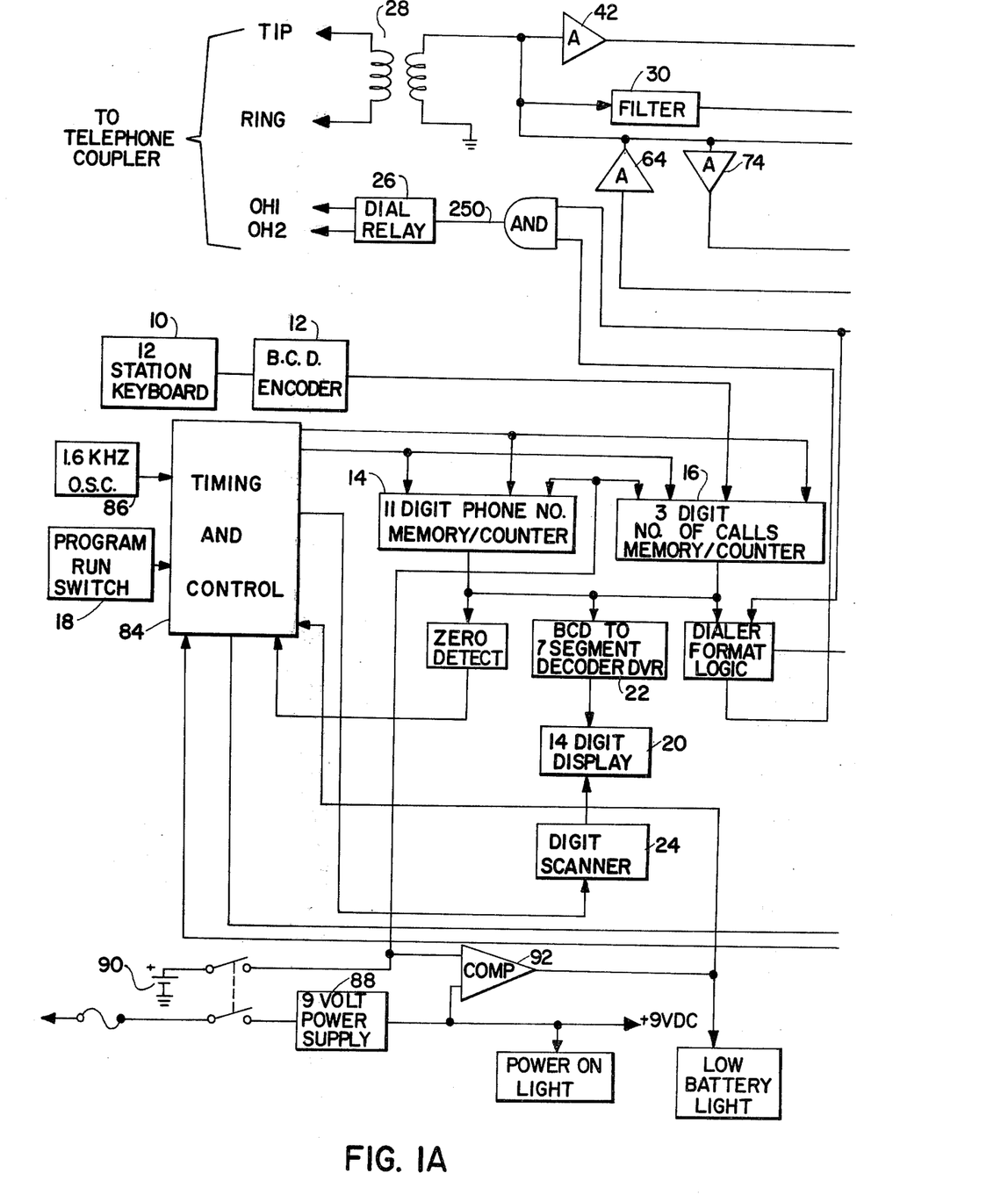
Figure 1B:
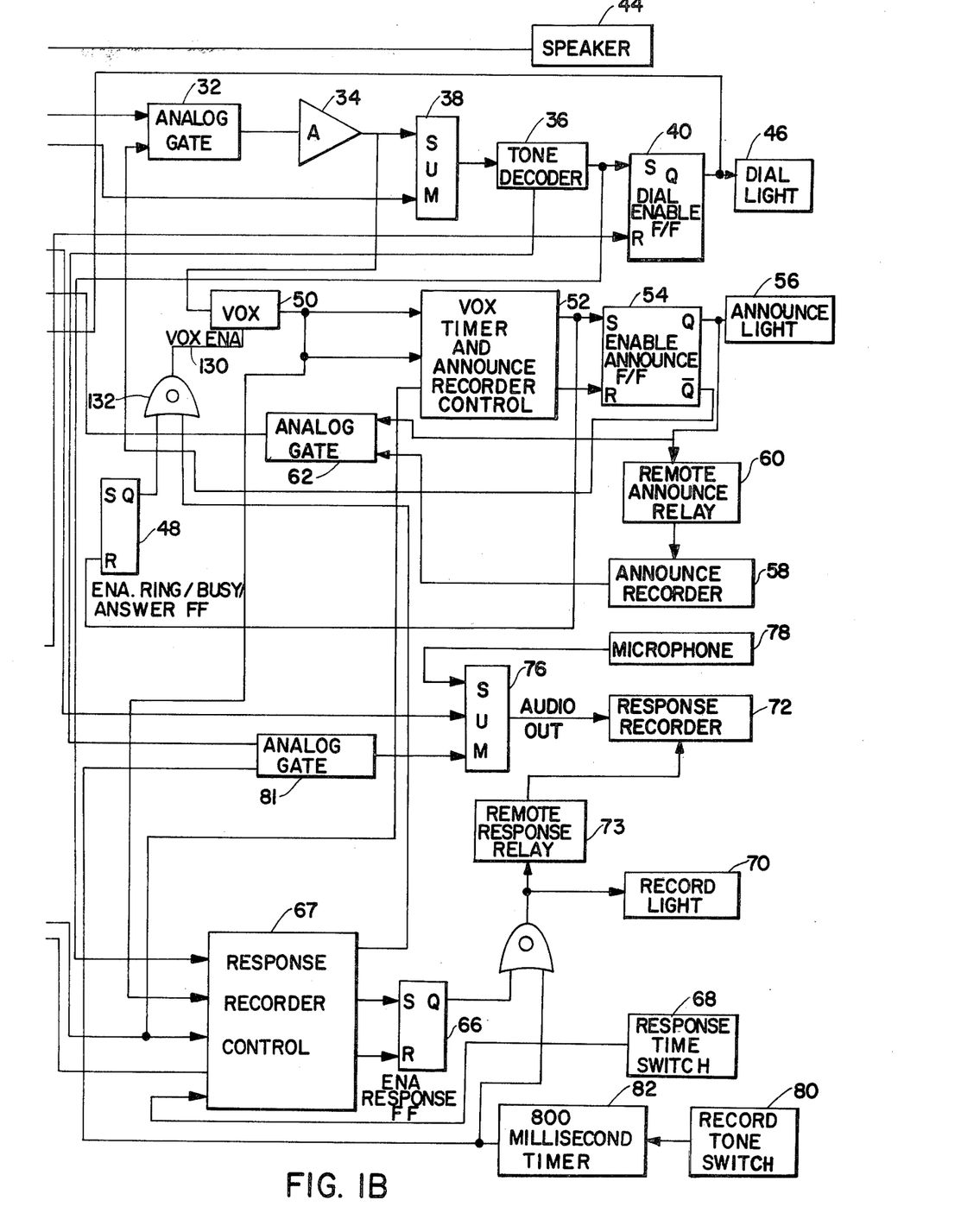

Referring now to FIG. 1, depicted therein is an overall block schematic diagram of apparatus constructed in accordance with the principles of this invention which functions to supply a prerecorded message to a plurality of telephone subscriber stations in sequence and subsequently record responses from the stations after supplying the message thereto. The apparatus shown in FIG. 1 is coupled to a telephone line through a telephone operating company supplied coupler. The apparatus includes a control panel containing a keyboard and display. The keyboard is utilized to program the apparatus by keying in the initial phone number to be called and the number of calls to be made. The display is for displaying the telephone number being called, the number of calls to be made, and also includes indicators for displaying the system status, such as whether the apparatus is in the dial mode, the message delivery mode, the response recording mode, plus indicators as to the condition of the power supply. The control panel also includes control switches which will be described in more detail hereinafter.

The apparatus shown in FIG. 1 also includes an announcement recorder which contains the prerecorded message on an endless loop tape and a response recorder which is illustratively a tape cassette recorder into which blank recording tape cassettes are inserted.

The initial phone number to be called is entered by an operator via the 12-station keyboard 10. The keyboard data is encoded into a BCD format by encoder 12 and stored in 11-digit memory/counter 14. The number of digits required is dependent on the type of call: i.e., local, local long distance, and long distance. A 3-digit memory/counter register 16 is provided to store the number of calls to be made. Phone numbers, or the number of calls, are programmed by first depressing the * button or # button on the keyboard respectively, with Program/Run switch 18 in the Program position.

Programmed information is shown by a 14-digit display 20. Displayed data is controlled by a BCD to 7 segment decoder driver 22 and digit scanner 24. Once the initial data is entered and visually checked, the Program/Run switch 18 is set to Run.

The telephone is electronically taken off hook by operating dial relay 26 to close to OH1 and OH2 contacts connected to the coupler. The dial tone appearing across the tip and ring connection of the audio transformer 28 is coupled to filter 30 and analog gate 32. Dial tones are passed by gate 32, amplified by amplifier 34, and presented to tone decoder 36 via a summing network 38. In response to the 440 Hz dial tone signal, tone decoder 36 provides a signal to set dial enable flipflop 40. If no tone appeared within 40 seconds, the phone is placed back on hook for a period of eight seconds before a new attempt is made.

All signals appearing on the telephone line are also presented to power amplifier 42 which drives speaker 44. This allows an operator to monitor events as desired.

Once set, enable dial flipflop 40 turns on dial light 46 and enables encoded dial data to be presented to dial relay 26. Numbers are dialed by opening and closing the OH1 and OH2 contacts. When the dialed number is completed, enable dial flipflop 40 is reset and enable ring/busy/answer flipflop 48 is set, and dial light 46 is extinguished.

Detection of rings, busy signals or answers is accomplished by timing a voice activated device (VOX) 50. Conventional methods of ring and busy detection through use of tone decoders presents problems due to inconsistencies between local telephone companies with respect to signalling frequencies. Ring and busy frequencies vary from exchange to exchange with no nationwide standard expected until the year 2000.

VOX 50 and associated timer 52 together form a timed energy detector. Logic is provided to discriminate between ring and busy signals. Once the phone is answered, additional discrimination is provided to determine if the answering party is a legitimate subscriber or recorded announcement.

In the event that the call is not answered, the line is busy, or a recorded announcement is on the line, the phone is hung up, phone number counter 14 is incremented by a fixed number, illustratively 10, and number of calls counter 16 decremented by one.

Detection of a valid answer sets enable announce flipflop 54 and clears enable ring/busy/answer flipflop 48. Announce light 56 is illuminated. Concurrently, announcement recorder 58 is turned on by remote announce relay 60.

The recorder announcement is passed by analog gate 62, amplified by amplifier 64, and presented to the phone line. A tone at the same frequency as the dial tone signals the called party that the announcement is completed. This same tone is presented to tone decoder 36 via summing network 38. Detection of the tone resets enable announce flipflop 54 and conditionally sets enable response flipflop 66. Useage of a tone permits variable length announcements within the time limits of endless loop tapes.

Enable response flipflop 66 will be set by response recorder control 67 provided that response time switch 68 is not set to zero. In this event, the logic is cleared to its starting condition and the next number is processed. Once enable response flipflop 66 is set, record light 70 is illuminated and response recorder 72 turned on through relay 73. Signals from the phone line are amplified by amplifier 74 and presented to recorder 72 via summing network 76. If no signals are detected, or if a dial tone is detected within a 4-second interval, enable response flipflop 66 is reset, signalling the start of a new cycle.

If the called party continues to respond, the recorder 72 will remain on for the duration of the response time setting. A new cycle is then initiated.

The announcement tape is programmed by inserting the endless loop tape into response recorder 72, and placing the unit in the program mode of operation. Signals from microphone 78 are presented to recorder 72 via summing network 76. Depressing record tone switch 80 gates a 440 Hz signal to the recorder from tone decoder 36 through gate 81 for a duration of 800 milliseconds, as determined by timer 82.

The overall system is under the control of timing and control circuit 84, which provides control signals at the proper times and in the correct sequence to the various circuits in the apparatus. Basic timing is provided by oscillator 86.

The apparatus is designed to be powered by standard utility supplied 60 Hz 117 volt AC power. This is converted to 9 volt DC power by supply 88 to power all the logic circuitry. In the event of a power failure, there is also provided 9 volt battery 90 to insure integrity of memories 14 and 16. Comparator 92 provides a signal to disable the apparatus if battery 90 is not at full potential.

Figure 2:
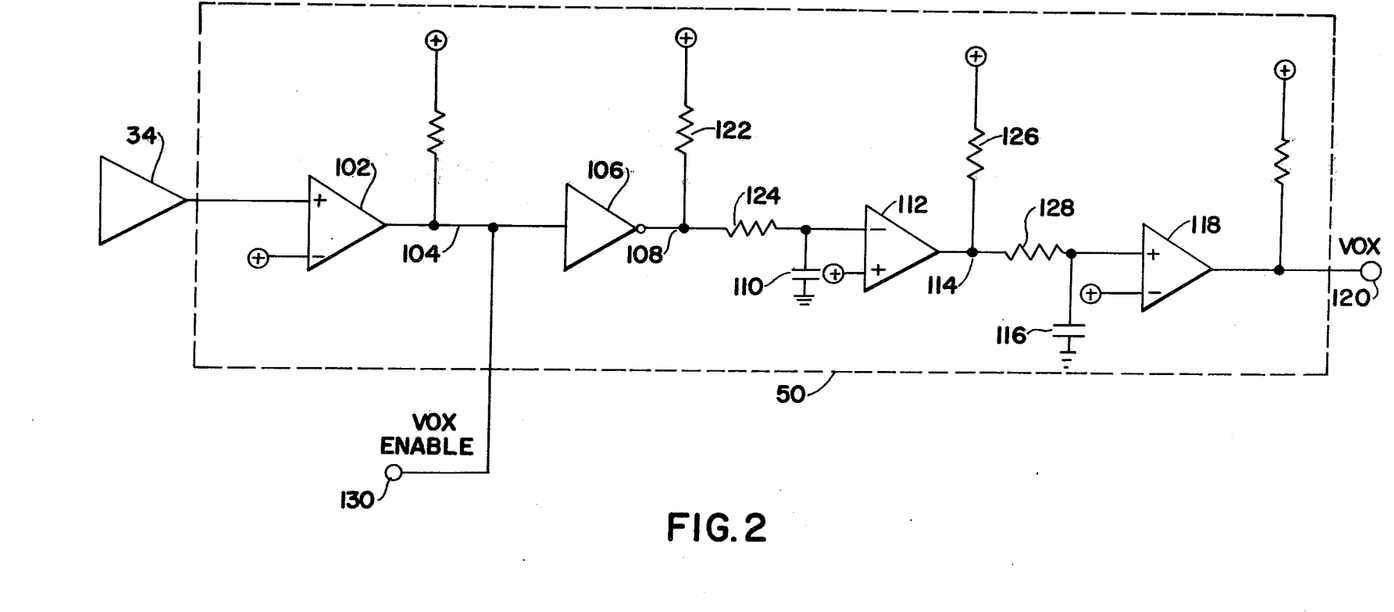
FIG. 2 depicts a schematic diagram of circuitry for detecting energy on the telephone line and providing an output signal upon detection of such energy.

Referring now to FIG. 2, VOX 50 is coupled to receive the output of amplifier 34, whose input is derived from signals on the telephone line. VOX 50 consists of a halfwave rectifier with preset squelch and two integrating circuits. The first integrating circuit is a fast attack, slow decay integrator to smooth the rectifier output so as to provide a voltage corresponding to the average energy level of the audio input. The output of this integrating circuit is fed to a comparator. If the average energy level is above a preset bias the comparator is turned on. The output of this comparator is integrated by a slow attack, fast decay circuit to eliminate high energy, short duration, switching noises on the telephone line. The resulting signal is the input to another comparator. When this signal is above a preset bias, the output of the VOX is a logic ONE.

The aforementioned halfwave rectifier with preset squelch is comparator 102, which is a rectifier with a bias. When the output of amplifier 34 on the non-inverting input of comparator 102 is higher than the bias applied to the inverting input of comparator 102, the output of comparator 102 on line 104 is high. Inverter 106 inverts the signal on lead 104 to provide a low signal at its output on lead 108, discharging capacitor 110. When the voltage across capacitor 110 gets below the bias input to comparator 112, the output of comparator 112 on lead 114 goes high. Capacitor 116 then charges. When the voltage across capacitor 116 gets above the bias voltage applied to the inverting input of comparator 118, comparator 118 provides a high signal (a logic ONE) at VOX output 120. When there is no energy on the telephone line, the output of comparator 102 is low, causing the output of inverter 106 to be high, charging capacitor 110, placing a low signal on the output of comparator 112, discharging 116, and providing a low signal (a logic ZERO) at VOX output 120.

Illustratively, resistor 112 has a value of 100K ohms, resistor 124 has a value of 4K ohms, resistor 126 has a value of 22K ohms, and resistor 128 has a value of 4K ohms. Because of these relative resistance value, the integrating circuit of which capacitor 110 is a part, is a fast attack, slow decay integrator because capacitor 110 discharges very quickly through the 4K ohm resistor 124 and charges much slower through the 104K ohm resistance combination of resistors 122 and 124. This integrating circuit smooths the rectifier output to provide a voltage corresponding to the average energy level of the audio input. The other integrating network, comprising resistors 126 and 128 and capacitor 116 is a slow attack, fast decay circuit wherein when there is energy on the telephone line, capacitor 116 charges through a 26K ohm path and when there is no energy detected on the telephone line, capacitor 116 discharges quickly through a 4K ohm path. The purpose of this arrangement is to kill short duration pulses which get through the first integrating network because of its fast attack characteristic.

VOX enable terminal 130 is utilized to selectively enable and disable VOX 50. When a low level is applied to terminal 130, the output of comparator 102 is clamped low, keeping the output of inverter 106 high shich allows capacitor 10 to charge, thereby keeping the output of comparator 112 low, which keeps capacitor 116 discharged and VOX output terminal 120 is maintained low. To enable VOX 50, VOX enable terminal 130 is allowed to float, with no voltage being applied thereto. To accomplish the aforedescribed function, VOX enable terminal 130 is connected to an open collector gate 132 (FIG. 1).

Figure 3:
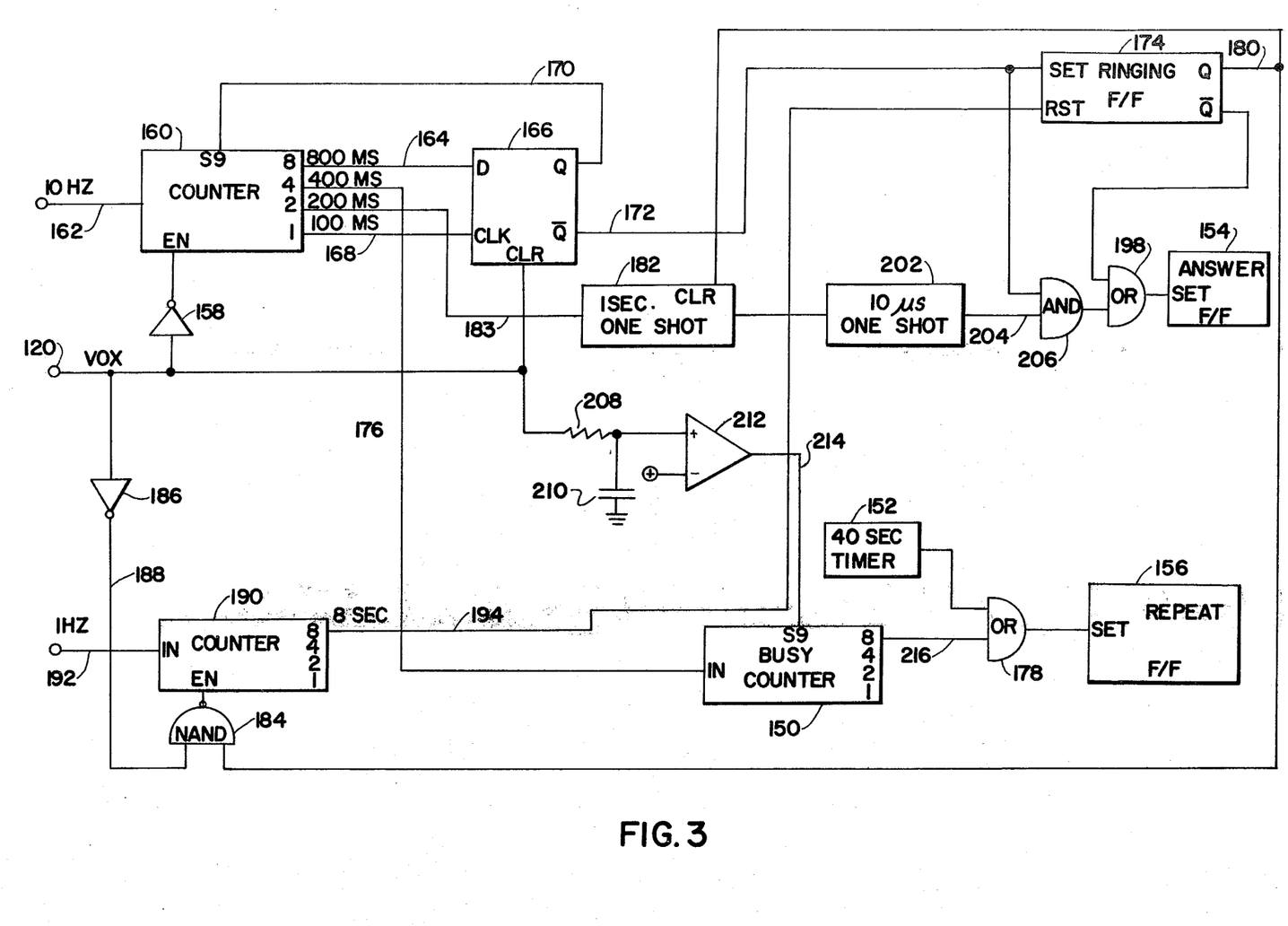
FIG. 3 depicts a functional block schematic diagram of discrimination circuitry for timing the energy detection of the circuitry of FIG. 2 and discriminating between different conditions on the telephone line.

Referring now to FIG. 3, functionally depicted therein is circuitry responsive to the output of VOX 50 for discriminating between different conditions on the telephone line. To determine that a call has been answered, it is first necessary to determine that at least one ring has appeared on the telephone line. A discrimination that this first ring has appeared on the telephone line is determined by a continuous VOX output of at least 900 milliseconds. After the first ring signal, if 40 seconds elapse before an answer is detected, the apparatus automatically terminates the telephone connection. If, after one or more rings, the called party answers the phone by lifting the receiver and saying "Hello", a normal response, the VOX will be activated by the "Hello" on the line. This word is normally more than 200 milliseconds but less than 1.2 seconds in duration. Thus, a VOX output for more than 200 milliseconds but for less than 1.2 seconds is considered to be an answer. If the called party merely lifts the receiver without saying anything, silence on the line for 8 seconds is also considered to be an answer. The call may also be answered by a recorded message which will appear on the line either because the number called is intercepted by the telephone company or an automatic telephone answering device is in use at the called number. In either case, a message of 10 seconds or more duration will appear on the telephone line. Because of natural pauses between words, the VOX output will not remain high during the entire message. However, it has been found that under such circumstances, the VOX output will remain high more than 80 per cent of the time. If the VOX output is high more than 80 per cent of the time for approximately five seconds, the apparatus is caused to automatically hang up. The final telephone line condition which is discriminated is the presence of a busy signal on the telephone line. These signals are nominally 500 milliseconds in duration alternating with 500 milliseconds of silence. Since the busy signals are less than 900 milliseconds in duration, a ringing condition is not detected. Since each is greater than 400 milliseconds in duration, a busy counter is incremented. When the busy counter reaches a count of eight, the apparatus is caused to automatically hang up.

In summary, then, the discrimination of telephone line conditions is as follows:

BUSY: 8 VOX activations of more than 400 milliseconds but less than 900 milliseconds;

FIRST RING: VOX activation of more than 900 milliseconds;

SUBSEQUENT RING: VOX activation of more than 1.2 seconds but less than 50 percent VOX activity for any five second period;

ANSWER: VOX activation of more than 200 milliseconds but less than 1.2 seconds or eight seconds of inactivity of the VOX after the first ring;

RECORDED MESSAGE: VOX activation during 80 per cent of any five second interval; and NO ANSWER: Expiration of 40 second timer.

Figure 5:
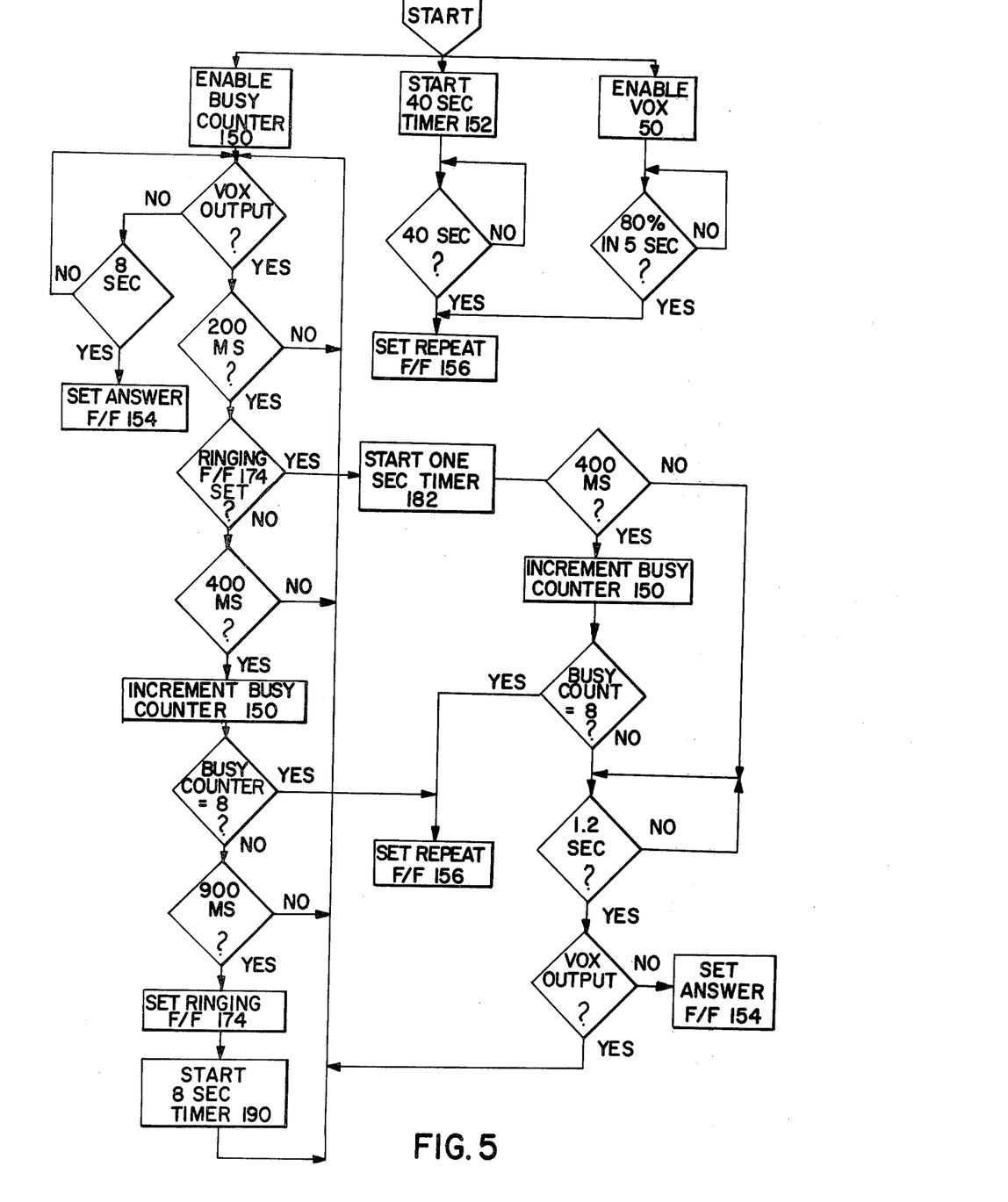
FIG. 5 depicts a flow chart for the circuitry shown in Fig. 3 showing the algorithm for discriminating between different conditions on the telephone line.
Figure 6:
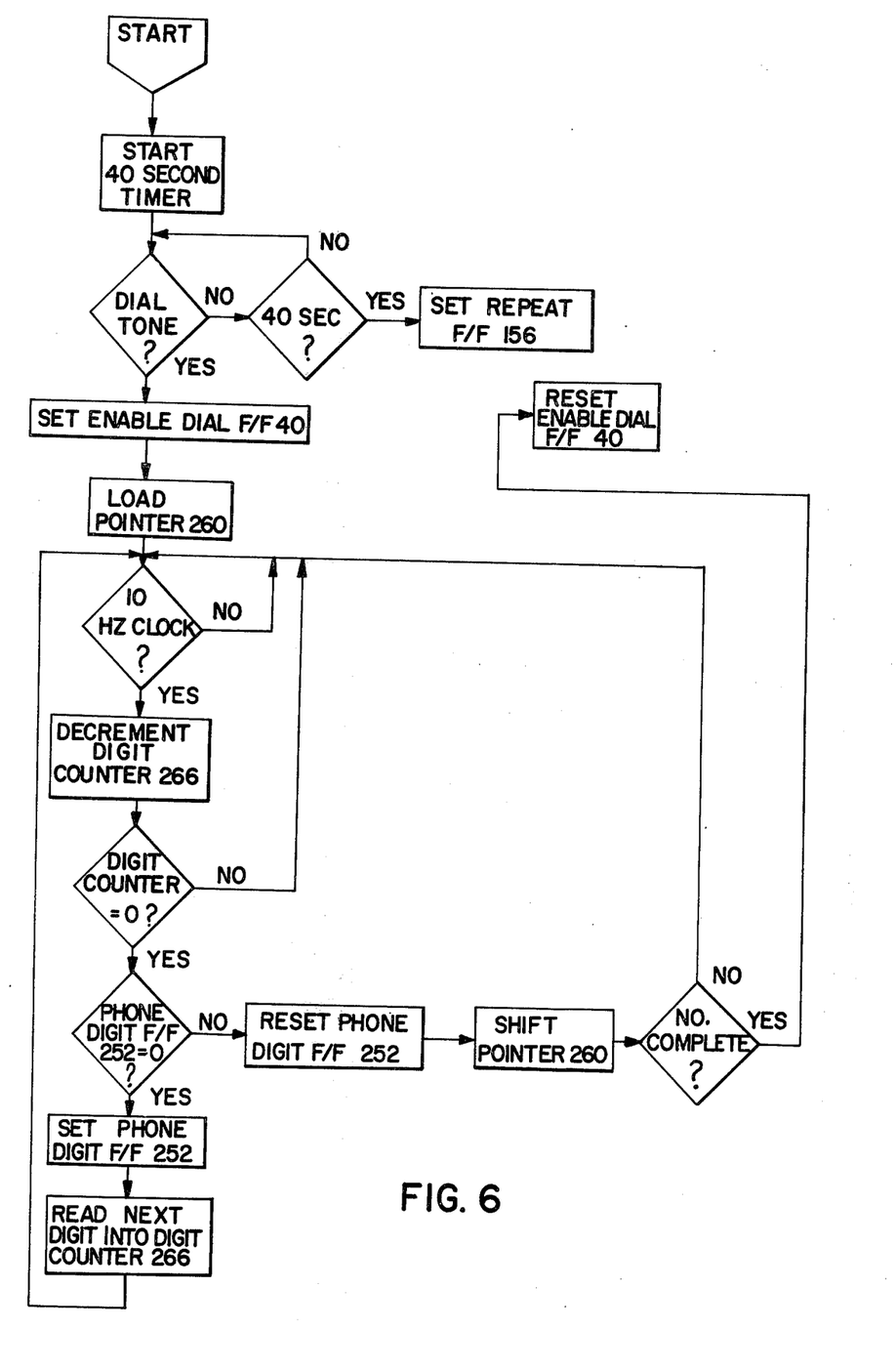
FIG. 6 depicts a flow chart which will be helpful in understanding the functioning of the circuitry of FIG. 4 for dialing a telephone number.

To understand how the foregoing is accomplished, the reader is referred to FIG. 3 which depicts, in functional form, circuitry for accomplishing the discrimination discussed above. The design of particular circuitry for implementing the functional blocks shown in FIG. 3 will be apparent to one of ordinary skill in the art, standard integrated circuit building blocks being commercially available to implement the different functions. FIG. 3 is a functional simplification of circuitry within VOX timer and announce recorder control circuit 52 (FIG. 1), certain particular details of the circuitry not being shown, such as, for example, all the timimg leads from timing and control circuit 84 (FIG. 1). The following description of FIG. 3 follows the flow chart shown in FIG. 5. The circuitry of FIG. 3 and the flow chart of FIG. 5 function after a number is dialed. The dialing will be described in more detail hereinafter with reference to FIGS. 4 and 6.

After a number is dialed, VOX 50 is enabled, busy counter 150 is enabled (by means not shown) and 40 second timer 152 is enabled (also by means not shown). The circuitry shown in FIG. 3 causes either answer flipflop 154 or repeat flipflop 156 to be set as a consequence of the particular condition discriminated. Answer flipflop 154 is set only when a valid answer is detected. Repeat flipflop 156 is set either when the 40 second timer 152 times out due to continued ringing, or a busy condition is detected, or a recorded message is sensed on the telephone line. When answer flipflop 154 is set, the recorded announcement is transmitted over the telephone line. When repeat flipflop 156 is set, the connection to the telephone line is terminated by the apparatus hanging up and the start of a new call is initiated, in a manner to be described subsequently. Timer 152 is reset after detection of a line condition (by means not shown).

With VOX 50 enabled, when the first ring appears on the telephone line, terminal 120 is high. This high signal is inverted by inverter 158 to provide a low signal to the enable input of counter 160, enabling counter 160 to begin counting the 10 hertz pulses on its input lead 162. These 10 hertz pulses are supplied by timing and control circuit 84 (FIG. 1). When counter 160 reaches a count of 8, this indicates that 800 milliseconds of VOX detected energy on the telephone line has occurred. This provides a high signal on lead 164 to the D input of flipflop 166. When counter 160 reaches a count of 9, lead 168 also goes high, clocking and setting flipflop 166 so that its Q output on lead 170 goes high, flipflop 166 having previously been cleared by the VOX input on terminal 120 being low. With a high signal on lead 170, counter 160 is set to an internal count of 9 and is held at that count as long as the high signal persists on lead 170. When the Q output of flipflop 166 went high at the count of 9 from counter 160, the $\overline{Q}$ output of flipflop 166 on lead 172 went low, setting ringing flipflop 174. This setting of ringing flipflop 174 indicates that 900 milliseconds of VOX activity has been detected. Before this setting of ringing flipflop occurred, when counter 160 reached a count of 4, indicating 400 milliseconds of VOX activity, a signal on lead 176 caused busy counter 150 to be incremented. When busy counter 150 reaches a count of 8, it causes repeat flipflop 156 to be set through OR gate 178. However, as this is the start of a ringing cycle, busy counter is only at a count of 1. It will also be recalled that 40 second timer 152 has been started. If 40 second timer 152 times out, it will set repeat flipflop 156 through OR gate 178.

With ringing flipflop 174 set, a high signal appears at its Q output on lead 180. A high signal on lead 180 removes the clear input from one second one-shot 182. The high signal on lead 180 also partially enables NAND gate 184. The other input to NAND gate 184 is the output of inverter 186 whose input is the VOX output on terminal 120. With no VOX activity, the output of inverter 186 on lead 188 will be high. With the concurrence of no VOX activity and ringing flipflop 174 being set, the output of NAND gate 184 will enable counter 190 to count the one hertz pulses applied to its input on lead 192 from timing and control circuit 84 (FIG. 1). When counter 190 reaches a count of 8, this indicates that 8 seconds of silence on the telephone line have occurred at some point after a first ring has been detected. As discussed above, this is interpreted as an answer. Therefore, with an output signal being applied to lead 194 from counter 190, indicating that counter 190 has timed 8 seconds of VOX inactivity after the ringing flipflop 174 has been set, ringing flipflop 174 is reset. The $\overline{Q}$ output of ringing flipflop 174 on lead 196 going high causes answer flipflop 154 to be set through OR gate 198.

Assuming that subsequent ringing signals are detected, busy counter 150 will be incremented after 400 milliseconds of each ringing signal. Since ringing signals are spaced nominally six or seven seconds apart, 40 second timer 152 will time out before busy counter 150 reaches a count of 8. However, if busy signals are detected on the line, these signals only last 500 milliseconds and busy counter 150 will be incremented once each second, therefore reaching a count of 8 in approximately 8 seconds, causing repeat flipflop 156 to be set.

Returning now to the condition of continued ringing, with ringing flipflop 174 set, the clear input is removed from one second one-shot 182. After 200 milliseconds of VOX activity, one second one-shot 182 is fired by the signal on lead 183 from counter 160. At the end of its one second time period, 10 microsecond one-shot 202 is fired. 10 microsecond one-shot 202 is utilized to provide a strobe pulse on lead 204 which checks to see whether VOX activity still persists, as determined by the state of flipflop 166. If VOX activity still persists, lead 172 will be low. However, if there is no longer any VOX activity, 1.2 seconds after VOX activity has started, flipflop 166 will have been cleared and lead 172 will be high, enabling AND gate 206 and causing answer flipflop 154 to be set through OR gate 198. This condition is, as described above, a valid answer condition in that there has been VOX activity for at least 200 milliseconds but for less than 1.2 seconds.

The last condition to be discriminated is the condition of a recorded announcement, which is detected as 80 per cent VOX activity for 5 seconds. To detect such condition, there is provided resistor 208, capacitor 210, and comparator 212. Resistor 208 and capacitor 210 form an integrating network. Their values are illustratively chosen to be 1.2 megohm for resistor 208 and 3.3 microfarads for capacitor 210. This provides an approximately five second time constant and the reference voltage applied to the inverting input of comparator 212 in combination with the resistance capacitance network causes a low signal to appear at the output of comparator 212 on lead 214 after approximately five seconds and 80 per cent VOX activity. This low signal on lead 214 causes busy counter 150 to be set to 9. With busy counter 150 set to 9, its 8 count output on lead 216 is high, causing repeat flipflop 156 to be set through OR gate 178. In other words, a recorded announcement on the line is detected and the circuitry is logically set as if a busy condition were sensed.

Figure 4:
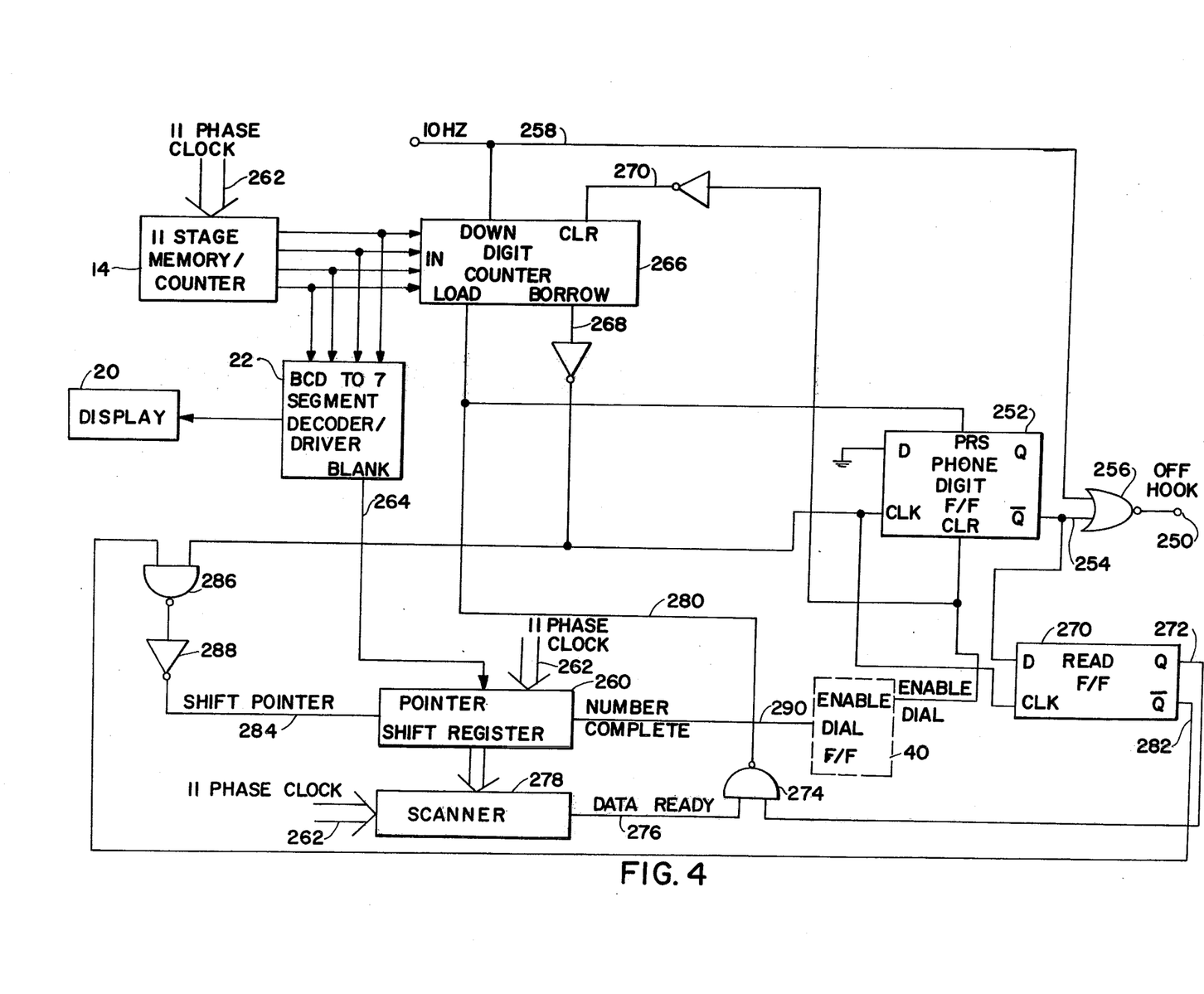
FIG. 4 depicts a functional block schematic diagram of circuitry for generating dial pulses to dial a telephone number.

Referring now to FIG. 4, functionally shown therein is a block schematic diagram of circuitry for implementing the dialing function after dial tone is detected by tone decoder 36 (FIG. 1) and enable dial flipflop 40 is set thereby. The following description of the circuitry shown in FIG. 4 describes how the circuitry functions to follow the flow chart of FIG. 6, and the reader is referred thereto during the following description.

Dialing is accomplished by alternately energizing and de-energizing dial relay 26 (FIG. 1). Off-hook terminal 250 is connected to dial relay 26 and a low signal at terminal 250 energizes relay 26. A high signal on terminal 250 de-energizes relay 26. When relay 26 is energized, it closes the connection in the telephone coupler between OH 1 and OH 2, thereby providing an off-hook to the telephone line. During a telephone connection, the condition of the telephone line is normally off-hook. During dialing, a sequence of on-hooks alternating with off-hooks causes the telephone switching equipment at the local telephone company central office to count the number of on-hooks to determine the particular digit that was dialed. During the telephone connection, phone digit flipflop 252 is normally in a reset state so its $\overline{Q}$ output on lead 254 is high, causing NOR gate 256 to provide a low output on terminal 250. During the dialing, in a manner to be described hereinafter, phone digit flipflop 252 is set so its $\overline{Q}$ output is low, causing the 10 hertz clock pulses on lead 258, supplied by timing and control circuit 84 (FIG. 1), to generate alternate on-hook and off-hook signals at terminal 250. The length of time that phone digit flipflop 252 is set is determined by the particular digit being dialed so that the proper number of 10 hertz clock pulses pass through NOR gate 256.

When it is desired to dial a phone number, a 40 second timer (not shown) is started and dial tone decoder 36 is monitored to determine whether dial tone is detected within that 40 second period. If the 40 second timer completes timing the 40 second interval without dial tone being detected, repeat flipflop 156 is set (FIG. 3, by means not shown) to restart the cycle. When dial tone is detected, enable dial flipflop 40 is set. This removes the clear from the phone digit flipflop 252, leaving a high signal on its Q output on line 254. At this time, pointer shift register 260 is loaded, its contents indicating how many digits are to be dialed, in a manner to be described by the following.

The number to be dialed is stored in 11 stage memory/counter 14. This number is stored in binary coded decimal (BCD) form. At this time, the number is to be displayed on display 20. An 11 phase clock over leads 262 from timing and control circuit 84 (FIG. 1) sequentially causes the eleven possible phone digits to be outputted to BCD to 7 segment decoder/driver 22 which controls display 20. A telephone number being dialed has at a maximum 11 digits: an initial ONE, three digits for the area code, and seven digits for the local telephone number. Some of these digits may not be utilized, but in all cases, the first digit to be dialed is not zero. Therefore, leading zeros are logically ignored and displayed as blanks, not zeros. Decoder/driver 22 has an output lead 264 that is high (a logical ONE) when a digit is blank. These are all in the leading positions of the possible 11 digit phone number. It is these signals on lead 264 that are gated into pointer shift register 260 by the 11 phase clock on leads 262. Pointer shift register 260 is a 12 bit shift register, its first bit position always being a ONE, the next four bit positions indicating if there are blank digits not to be dialed, and the last seven bit positions being ZERO. Therefore, the number of trailing ZEROS in pointer shift register 260 corresponds to the number of phone digits to be dialed for a particular phone number. The number of leading ONES equals twelve minus the number of phone digits to be dialed.

After pointer 260 is loaded, and between successively dialed digits, there is a one second pause which is determined by examining the borrow output of digit counter 266 on lead 268. Digit counter 266 is decremented by the 10 hertz clock pulses on lead 258. When enable flipflop 40 was set, digit counter 266 had been cleared to ZERO by the signal on its clear input 270. When digit counter 266 is decremented, it takes 10 pulses of the 10 hertz clock on lead 258 to bring digit counter 266 back to ZERO again, at which time there is a low signal at its borrow output on lead 268. At this time, phone digit flipflop 252 and read flipflop 270 are clocked. This does not change the state of phone digit flipflop 252, because its $\overline{Q}$ output was already high. However, read flipflop 270 is clocked to provide a high signal on its Q output on lead 272. This partially enables NAND gate 274. The other input to NAND gate 274, called DATA READY, on lead 276 is the output of scanner 278. Scanner 278 utilizes the 11 phase clock on leads 262 to look at the first 11 bit positions of pointer 260. Whenever there is a ONE in one of the bit positions of pointer shift register 260, a DATA READY pulse on lead 276 is generated. This causes a pulse to be generated on lead 280 which is the load input of digit counter 266. This causes the corresponding digit of 11 stage memory/counter 14 to be loaded into digit counter 266. As long as there is ONE in pointer shift register 260, a digit is read into digit counter 266, but only the last digit read in will remain in digit counter 266; each time a digit is read in it erases the previous digit read in. The load pulse on lead 280 also preset phone digit flipflop 252 to cause its $\bar{Q}$ output on lead 254 to go low. This allows the output of NOR gate 256 to be controlled by the 10 hertz clock pulses on lead 258. It should be noted at this point that the 11 phase clock on leads 262 are at a much faster rate than the 10 hertz pulses on lead 258 so that during the time that the above-mentioned loading of digit counter 266 has occurred, there have been no 10 hertz clock pulses on lead 258.

Now that a digit is stored in digit counter 266, the 10 hertz clock pulses on lead 258 decrement digit counter 266. Each time that a 10 hertz clock pulse on lead 258 decrements digit counter 266 it also generates an on-hook signal at lead 250. This continues until digit counter 266 reaches zero, so that a number of on-hook pulses have been generated corresponding to the digit to be dialed. When digit counter 266 reaches zero, its borrow output on lead 268 clocks phone digit flipflop 252 and read flipflop 270. (At this point it should be noted that the decrementing occurs prior to checking the borrow output so that if a phone digit were zero, ten dial pulses would have been generated). Since phone digit flipflop 252 had been in the set state with its $\bar{Q}$ output low, read flipflop 270 is clocked so that its $\bar{Q}$ output on lead 282 is now high. Phone digit flipflop 252 is clocked so its $\bar{Q}$ output on lead 254 now goes high. The high output on lead 282 combines with the borrow output on lead 268 to generate a shift pointer signal on lead 284 through NAND gate 286 and inverter 288. This shift pointer signal on lead 284 shifts the array of leading ONES in pointer 260 one position toward the trailing end.

At this time, digit counter 266 is decremented by the 10 hertz pulses on lead 258 to provide the one second interdigit pause. When digit counter 266 again reaches ZERO, phone digit flipflop 252 and read flipflop 270 are clocked. This causes the next digit in 11 stage memory/counter 14 to be read into digit counter 266 because the last ONE bit in pointer shift register 260 has been moved one position toward the trailing end. The aforedescribed cycle is repeated until the last phone digit of the number has been dialed. After the last phone digit has been dialed, when pointer shift register 260 has its contents shifted, a ONE will appear in its twelfth bit position. This causes a number complete signal to appear on lead 290, which resets enable dial flipflop 40, terminating the dialing sequence.

After the number is dialed, the circuitry shown in FIG. 3 and discussed above is utilized to discriminate between possible conditions on the telephone line. In the event that the repeat flipflop 156 has been set due to there being no answer, a busy condition, or a recorded announcement detected on the telephone line, a clear pulse is caused to be generated (by circuitry not shown), the apparatus terminates the telephone connection, increments 11 stage memory/counter 14 by a predetermined number to generate a new number, decrements number of calls memory/counter 16, and if it is determined by the contents of numbers of calls memory/counter 16 that calls are still to be made, an illustratively 8 second interval is timed after which the telephone connection is placed in an off-hook condition and the apparatus again waits to detect dial tone. In the event answer flipflop 154 had been set, this causes enable announce flipflop 54 (FIG. 1) to be set to transmit a message over the telephone line. After transmission of the message, enable response flipflop 66 will be set. If response time switch 68 is set to an ANNOUNCE ONLY position, enable response flipflop 66 will be immediately reset which will set repeat flipflop 156 to start the cycle over again.

Figure 7:
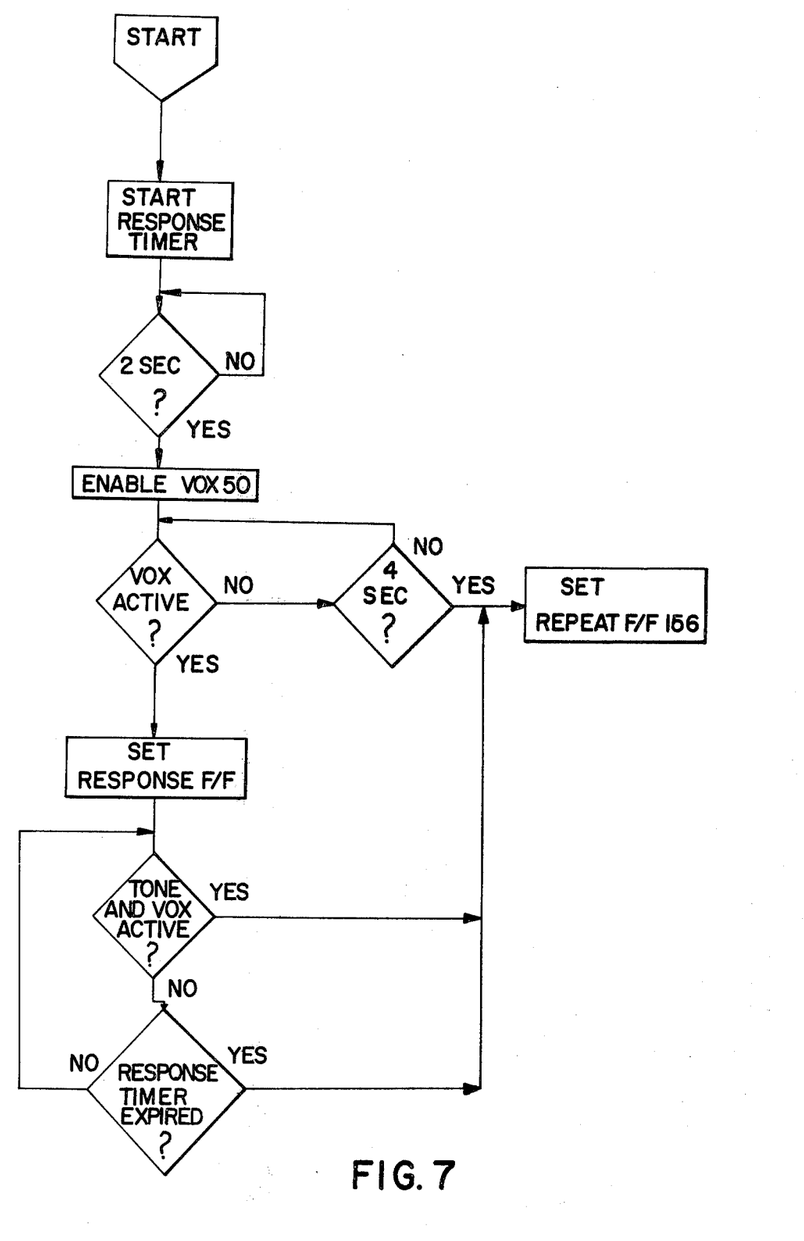
FIG. 7 depicts a flow chart for the apparatus of FIG. 1 depicting the steps in recording a response.

Assuming that response time switch 68 is set to one of the selected positions (illustratively 4, 12 or 20 seconds of response recording time), a response timer within response recorder control 67 will be started. The reader is referred now to FIG. 7 which depicts a flow chart showing how the apparatus functions to record a response. Assuming there is a valid response on the telephone line, in a manner to be described hereinafter, the setting of response time switch 68 causes the output of the response timer to be checked at corresponding time intervals and if the response timer reaches the set time, repeat flipflop 156 is set to initiate a new cycle. To check that a valid response is on the line, after two seconds, VOX 50 is enabled. This is to give the called party on the telephone line two seconds in order to think of something to say. If there is no output from VOX 50 at the end of four seconds, repeat flipflop 156 is set. If there is a VOX output detected, a response flipflop within response recorder control 67 is set to indicated that a valid response has been detected. At this time, the outputs of VOX 50 and tone decoder 36 are monitored. The concurrence of an output from VOX 50 and tone decoder 36 indicates that dial tone is on the line because the called party has hung up after giving some response. This causes repeat flipflop 156 to be set so that the apparatus terminates the connection and calls the next telephone number in sequence.

Accordingly, there has been described apparatus according to the principles of this invention for supplying a prerecorded message to a plurality of telephone subscriber stations in sequence and recording responses from the stations after supplying the message thereto. Advantageously, the apparatus detects the presence of energy on the telephone line and times such detection in order to discriminate between different conditions on the telephone line after the number is dialed. It is understood that the above-described arrangement is merely illustrative of the application of the principles of this invention. Numerous other arrangements may be devised by those skilled in the art without departing from the spirit and scope of this invention as defined by the appended claims.

What is claimed is:

1. Apparatus for sending and receiving messages on a telephone line comprising:
   means for generating a start signal;
   dialing means responsive to said start signal for providing dial signals indicative of a telephone number to said telephone line and a number complete signal upon completion of said providing;
   means rendered effective by said number complete signal and responsive to energy on said telephone line for providing a first signal in response to an energy condition on said telephone line indicative of an answer condition, and for providing a second signal in response to an energy condition on said telephone line indicative of a response condition other than said answer condition;
   means responsive to said first signal for transmitting a prerecorded message over said telephone line;
   means responsive to the end of said prerecorded message for generating an end of message signal;
   selectable switching means, connected to said end of message signal generating means, for conveying said end of message signal to a selected one of a first or a second terminals;

means responsive to said end of message signal being at said first terminal for generating a third signal;

means responsive to said end of message signal being at said second terminal for coupling one or more recording means to said telephone line, and response timer means connected to said coupling means for timing a predetermined interval upon the occurrence of said end of message signal at said second terminal and for generating a fourth signal at the termination of said predetermined interval;

and means responsive to any of said second, third, or fourth signals for actuating said start signal generating means.

2. Apparatus according to claim 1, wherein said response timer means includes means for selectively setting said predetermined interval.

3. Apparatus according to claim 1, further including means responsive to a dial tone occurring on said telephone line after the end of said prerecorded message and before said response timer means times said predetermined interval for actuating said start signal generating means.

4. Apparatus for supplying a prerecorded message to a telephone line comprising:

means for storing a telephone number to be called;
means for generating a start signal;
dialing means responsive to said start signal for providing dial signals indicative of a telephone number to said telephone line and a number complete signal upon completion of said providing, said dialing means including a counter, means for setting said counter with a digit of said telephone number, said counter setting means including a shift register having a leading end and a trailing end, the number of bit positions in said shift register being one more than the maximum number of digits to be dialed, means for inserting in said shift register a plurality of consecutive ONES starting at said leading end, the number of said ONES equaling the difference between the number of shift register bit positions and the number of digits of the telephone number to be called, means for scanning said shift register bit positions starting at the leading end, means for inserting into said counter the digits of the telephone number in sequence in synchronism with the scanning of said shift register whenever a ONE is detected in a bit position of said shift register, means for decrementing said counter, means responsive to said counter being decremented for generating a dial pulse, and means responsive to said counter reaching a count of zero for terminating said dial pulse generating;

means responsive to said number complete signal for incrementing the stored telephone number by a predetermined number;

means rendered effective by said number complete signal and responsive to energy on said telephone line for providing a first signal in response to an energy condition on said telephone line indicative of an answer condition, and for providing a second signal in response to an energy condition on said telephone line indicative of a response condition other than said answer condition;

means responsive to said first signal for transmitting said prerecorded message over said telephone line;

means responsive to the end of said prerecorded message for generating a third signal; and means responsive to either said second signal or said third signal for actuating said start signal generating means.

5. Apparatus according to claim 4, wherein said dialing means includes means for pausing a predetermined time between dialing of successive digits.

6. Apparatus according to claim 4, wherein said dialing means further includes means responsive to said counter reaching zero for shifting the contents of said shift register one position toward its trailing end.

7. Apparatus according to claim 6, wherein said dialing means further includes means responsive to the presence of a ONE in the shift register bit position closest to the trailing end for generating said number complete signal.

8. Apparatus for supplying a prerecorded message to a telephone line comprising:

means for generating a start signal;
dialing means responsive to said start signal for providing dial signals indicative of a telephone number to said telephone line and a number complete signal upon completion of said providing;
means rendered effective by said number complete signal and responsive to energy on said telephone line for providing a first signal in response to an energy condition on said telephone line indicative of an answer condition, and for providing a second signal in response to an energy condition on said telephone line indicative of a response condition other than said answer condition, said energy condition responsive means including;

a half-wave rectifier coupled to receive signals from said telephone line, first integrating means coupled to the output of said rectifier, said first integrating means having a fast attack, slow decay characteristic for smoothing the rectifier output so as to provide a voltage corresponding to the average energy level on said telephone line, a first comparator coupled to the output of said first integrating means and responsive to the output of said first integrating means being above a first present bias level to provide a first comparator output signal, second integrating means coupled to receive said first comparator output signal, said second integrating means having a slow attack, fast decay characteristic for eliminating high energy, short duration, switching noises on the telephone line, and a second comparator coupled to receive the output of said second integrating means and responsive to the output of said second integrating means being above a second preset bias for providing a signal indicative of energy on said telephone line;

means responsive to said first signal for transmitting said prerecorded message over said telephone line;

means responsive to the end of said prerecorded message for generating third signal; and means responsive to either said second signal or said third signal for actuating said start signal generating means.

* * * * *